(12) United States Patent
Tuyls et al.

(10) Patent No.: US 8,433,983 B2
(45) Date of Patent: Apr. 30, 2013

(54) SECURE PROTECTION OF BIOMETRIC TEMPLATES

(75) Inventors: Pim Theo Tuyls, Eindhoven (NL); Antonius Hermanus Maria Akkermans, Eindhoven (NL); Jasper Goseling, Lausanne (CH)

(73) Assignee: Koninklijke Philips Electronics N.V., Eindhoven (NL)

( * ) Notice: Subject to any disclaimer, the term of this patent is extended or adjusted under 35 U.S.C. 154(b) by 1304 days.

(21) Appl. No.: 12/067,988

(22) PCT Filed: Sep. 11, 2006

(86) PCT No.: PCT/IB2006/053200
§ 371 (c)(1),
(2), (4) Date: Mar. 25, 2008

(87) PCT Pub. No.: WO2007/036822
PCT Pub. Date: Apr. 5, 2007

(65) Prior Publication Data
US 2008/0222496 A1    Sep. 11, 2008

(30) Foreign Application Priority Data

Sep. 29, 2005 (EP) .................................... 05109007

(51) Int. Cl.
*G06F 11/00* (2006.01)
(52) U.S. Cl.
USPC ........................................................ 714/777
(58) Field of Classification Search .................... 714/777
See application file for complete search history.

(56) References Cited

U.S. PATENT DOCUMENTS

| 5,903,410 | A | * | 5/1999 | Blaum et al. | 360/77.08 |
| 6,038,315 | A | * | 3/2000 | Strait et al. | 713/183 |
| 6,363,485 | B1 | * | 3/2002 | Adams et al. | 713/186 |
| 2003/0088782 | A1 | | 5/2003 | Forrest | |
| 2003/0219121 | A1 | | 11/2003 | Van Someren | |

FOREIGN PATENT DOCUMENTS

DE    19940341 A1    3/2001

OTHER PUBLICATIONS

Pim Tuyls, et al: Practical Biometric Authentication with Template Protection, Lecture Notes in Computer Science, Springer Verlag, vol. 3546, AVBPA 2005, pp. 436-446.
Giovanni Costantini, et al: Neural Associative Memory Storing Gray-Coded Gray-Scale Images, IEEE Transactions on Neural Networks, vol. 14, No. 3, May 2003, pp. 703-707.
Pim Tuyls, et al: Capacity and Examples of Templates—Protecting Biometric Authentication Systems, Springer Berlin, Heidelberg, Philips Research, Eindhoven, vol. 3087, Sep. 2004, pp. 158-170.
Jean-Paul Linnartz, et al: New Shielding Functions to Enhance Privacy and Prevent Misuse of Biometric Templates, LNCS vol. 2688, AVBPA Jun. 2003, pp. 393-402.

* cited by examiner

*Primary Examiner* — Scott Baderman
*Assistant Examiner* — Jigar Patel
(74) *Attorney, Agent, or Firm* — Larry Liberchuk (57) ABSTRACT

This invention relates to methods and devices for verifying the identity of a person based on a sequence of feature components extracted from a biometric sample. Thereafter, the feature components are quantized and assigned a data bit sequence in such a way that adjacent quantization intervals have a Hamming distance of 1. The data bit sequences are concatenated into a bit string, and said bit string is combined with a helper data set by using an exclusive disjunction (XOR) operation into a codeword. Finally, the codeword is decoded into a secret V and a secret S is matched with the secret V.

11 Claims, 6 Drawing Sheets

SECURE PROTECTION OF BIOMETRIC TEMPLATES

This invention generally relates to methods and devices for verifying and enabling verifying the identity of a person. In particular, the methods and devices of the invention relate to storing sensitive information related to biometric data.

Every human being has a unique set of biometric data, such as fingerprints, iris, face, etc. This data is utilized in several modern security systems in order to achieve a higher level of security, and in order to achieve security systems in which users do not have to memories PIN-codes or to bring any access cards.

However, though biometric security systems have great advantages, there is a severe drawback with using such a security system, namely the risk of loosing the biometric reference data, which is held in the system for comparison with the enrolled biometric data. Loosing the reference data is a problem for all security systems, but since the biometric data is directly associated with a human body, the 'personal code' is not easily changed in a security system based on biometric data. Hence, methods and devices for secure storing of the biometric reference data are necessary for biometric security systems.

US 20030219121 A1 discloses a method and apparatus for the generation and use of a biometric cryptographic key to secure and retrieve data that involves combining a random key and the biometric information to generate a template.

In view of the above, an objective of the invention is to solve or at least reduce the problems discussed above. In particular, an objective is to achieve a method for storing sensitive information efficiently, that is performed in a simple manner and with a low cost.

According to a first aspect of the invention, the invention is realized by a method for verifying the identity of a person based on a sequence of feature components extracted from a biometric sample, comprising quantizing each feature component, assigning a data bit sequence to each quantized feature component in such a way that adjacent quantization intervals have a Hamming distance of 1, concatenating said data bit sequences into a bit string, combining said bit string with a helper data set by using an exclusive disjunction (XOR) operation, decoding said codeword into a secret V, and matching a secret S with said secret V.

An advantage with this first aspect is that the exclusive disjunction operation (XOR) is an efficient operation, which in turn makes the process efficient.

In one embodiment of this first aspect, each feature component is quantized into quantization intervals in such a way that the probability for each quantization interval is equal according to a statistical model. This method results in a uniformly distributed bitstring.

In one embodiment of this first aspect, the decoding is made according to an error correcting code.

An advantage with this type of decoding is that although a small measurement error has occurred in between the encoder 302 and the decoder 330, the decoder may recover the data due to the use of an error correcting code, which results in a lower FRR.

The error correcting code can be a binary error correcting code, such as Hamming code, or a multi-level correcting code, such as BCH code. Depending on redundancy of the code and number of errors required to be corrected, some leakage of template information may occur. Therefore, depending on the type of application, an error correction code is chosen to optimize security and system features by adjusting leakage, noise robustness and size of the secrets, which depends on the redundancy of the code.

According to a second aspect, the present invention is realized by a method for creating a helper data set based on a sequence of feature components extracted from a biometric sample and a secret S to enable verifying the identity of a person, comprising quantizing each feature component, assigning a data bit sequence to each quantized feature component in such a way that adjacent quantization intervals have a Hamming distance of 1, concatenating said data bit sequences into a bit string, encoding said secret S into a codeword, and combining said bit string with the codeword into said helper data set by using an exclusive disjunction (XOR) operation.

An advantage with this second aspect is that the exclusive disjunction operation (XOR) is an efficient operation, which in turn makes the process efficient.

According to a third aspect of the invention, the invention is realized by a device for verifying the identity of a person based on a sequence of feature components extracted from a biometric sample, comprising a quantizer for quantizing the feature components, an assigner for assigning a bit sequence to each quantized feature component in such a way that two adjacent quantization intervals have a Hamming distance of 1, a concatenater for concatenating each bit sequence into a bit string, an XOR-operator for combining said bit string with a helper data set into a codeword, a decoder for decoding said codeword into a secret V, and a matcher for matching a secret S with said secret V.

According to a fourth aspect of the invention, the invention is realized by a device for creating a helper data set based on a sequence of feature components extracted from a biometric sample and a secret S, comprising a quantizer for quantizing the feature components, an assigner for assigning a data bit sequence to each quantized feature component in such a way that two adjacent quantization intervals have a Hamming distance of 1, a concatenater for concatenating each bit sequence into a bit string, and an XOR-operator for combining said bit string with a corresponding codeword based on said secret S into said helper data set.

According to a fifth aspect of the invention, the invention is realized by a computer program product comprising instructions when downloaded to and executed on a processor being arranged to perform any of the methods according to the invention.

Other objectives, features and advantages of the present invention will appear from the following detailed disclosure, from the attached dependent claims as well as from the drawings.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one in-stance of said element, device, component, means, step etc., unless explicitly stated otherwise. The steps of any method disclosed herein do not have to be performed in the exact order disclosed, unless explicitly stated.

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein:

Figure 1:
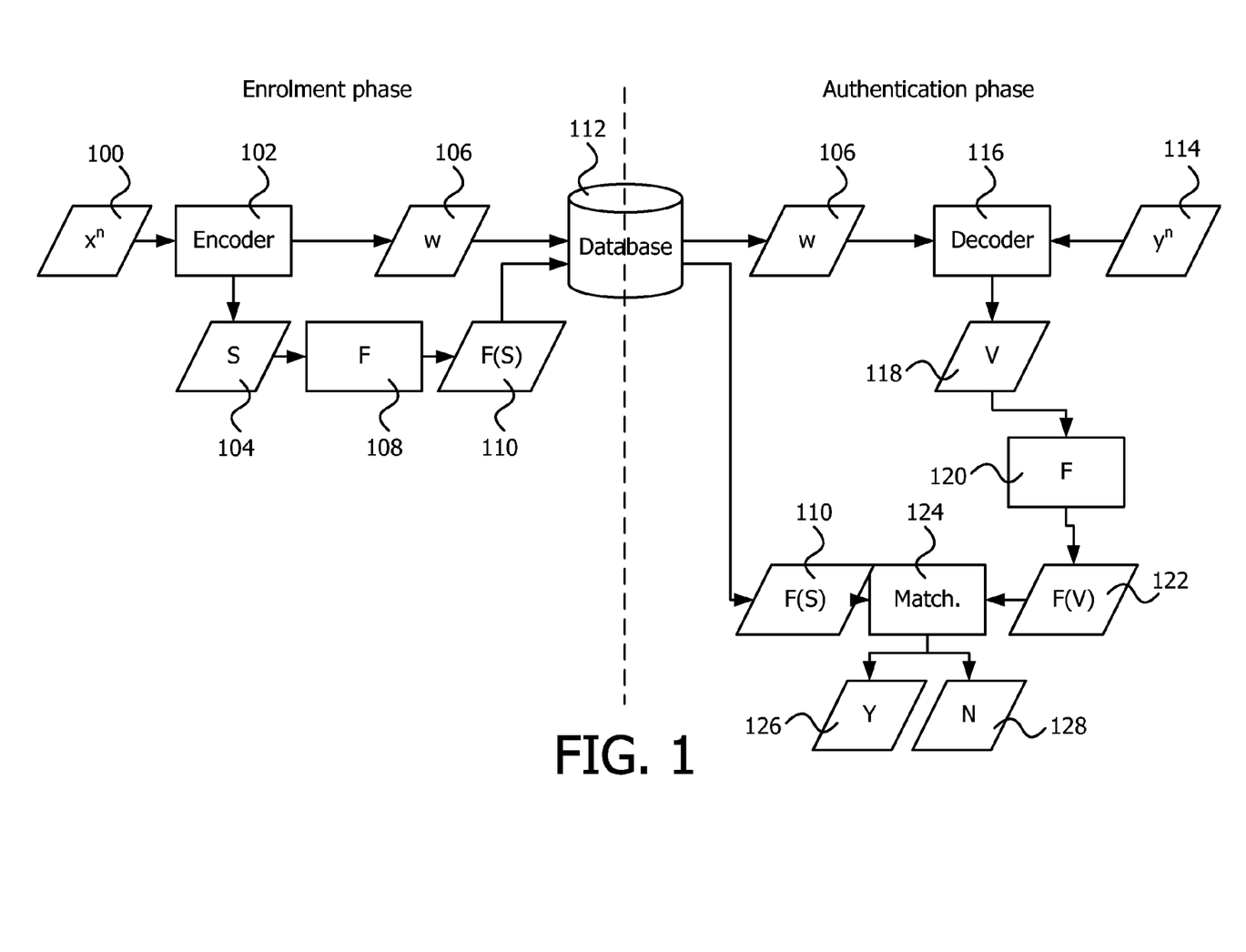
FIG. 1 diagrammatically illustrates a general approach for protecting biometric reference data.

A general approach for protecting biometric reference data using helper data is illustrated in FIG. 1. On the left side of the dashed line the enrolment phase is shown and on the right side the authentication phase is shown. The phases are illustrated together for better understanding of the approach, but can, as is readily understood, be used separately.

In the enrolment phase, some sort of biometric data, e.g. a fingerprint of a person, is read into the system by an appropriate reading device, e.g. a fingerprint scanner. The read biometric data give rise to a biometric template $x^n$ 100, which is unique for this person and hence important to protect.

The biometric template $x^n$ 100 is encoded by an encoder 102 into a secret S 104. Additionally, the encoder creates a helper data set w 106 based on the biometric template $x^n$ 100.

Thereafter, the secret S104 is input to a function F 108, preferably a one-way function, e.g. a hash function, to encrypt the secret S 104 into an encrypted secret, F(S) 110. After encrypting the secret, the encrypted secret F(S) 110 is stored in a database 112. The helper data set w 106 is also stored in the database 112, but without encryption.

In the authentication phase, a biometric sample for a person is read, denoted $y^n$ 114, and transferred into a decoder 116. The helper data set w 106 stored in the database 112 is also transferred into the decoder 116. Thereafter, the biometric sample $y^n$ 114 is decoded into a secret V 118 using the helper data set w 106.

Next, the secret V 118 is input to a function F 120, similar to the function F 108, in order to create an encrypted secret F(V) 122.

Finally, the encrypted secret F(S) 110, stored in the database 112, and the encrypted secret F(V) 122 are transferred into a matcher 124, which outputs a positive answer, Y 126, if F(S) 110 and F(V) 122 correspond to each other, otherwise a negative answer, N 128, is output.

In a system according to FIG. 1, the secrets S 104 and V 118 have to contain large amounts of data in order to achieve a low False Acceptance Rate (FAR). Secrets containing large amounts of data set in turn higher demands on the encoder 102 and the decoder 116.

In order to achieve a low FAR by using a reasonable amount of biometric data bits, the biometric data may first be divided into a number of feature components. This may be achieved by using Principal Component Analysis (PCA), Fisher analysis or Linear Discriminant Analysis (LDA).

After having divided the biometric data into a number of feature components, a value may be associated with each of the feature components.

Figure 2:
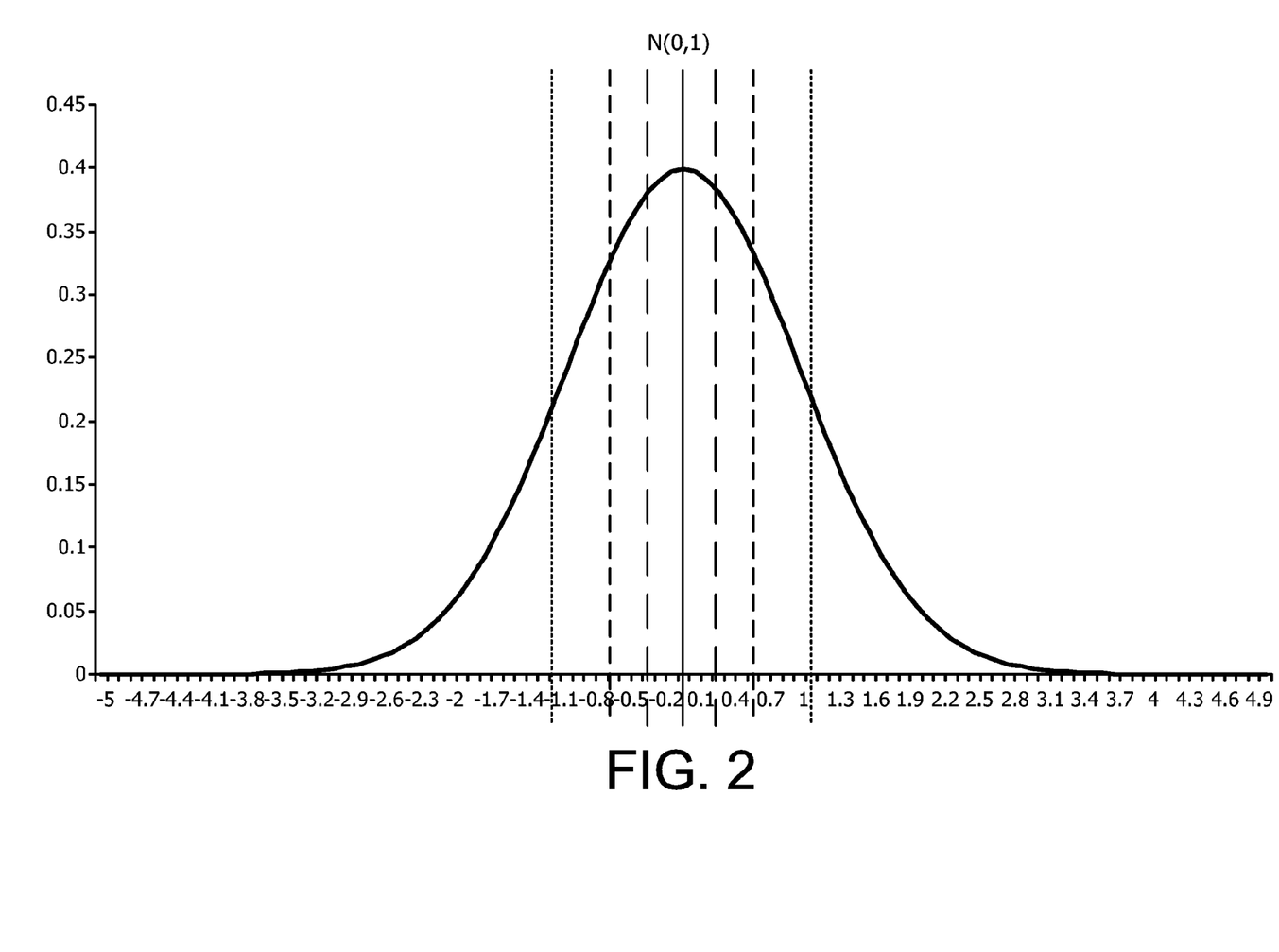
FIG. 2 generally illustrates a possible quantization of a feature component.

Thereafter, each feature component may be quantized. This quantization is preferably done in such a way that the probability for each quantization interval is equal. If, for example, the feature component is Gaussian distributed and each feature component is set to give rise to 8 sub-ranges, the quantization of one feature component is as shown in FIG. 2, wherein the dashed lines illustrate the separation between adjacent quantization intervals.

Since the number of quantization intervals is chosen to be 8, the probability for each quantization interval is 0.125 (⅛). It is convenient to choose a number in the form of $2^n$, where n is a positive integer, as the number of quantization intervals.

The statistical model may be predetermined, for example to be a Gaussian model, and because of this the sub-range separations may be predetermined as well.

Thereafter, a codeword is assigned to each possible interval, in such a way that the Hamming distance between codewords related to two adjacent quantization intervals is 1. This can be achieved by using a Gray code.

By quantizing and assigning a bit sequence to each of the feature components as described above, the Gaussian distributed biometric feature data is converted into resulting sequences which may be modeled as coming from a uniform binary independent identically distributed source.

The effect of this conversion is that the biometric data read in the authentication phase, which may be seen as the biometric data read in the enrollment phase with added noise, does only give rise to a limited number of bit errors.

Figure 3:
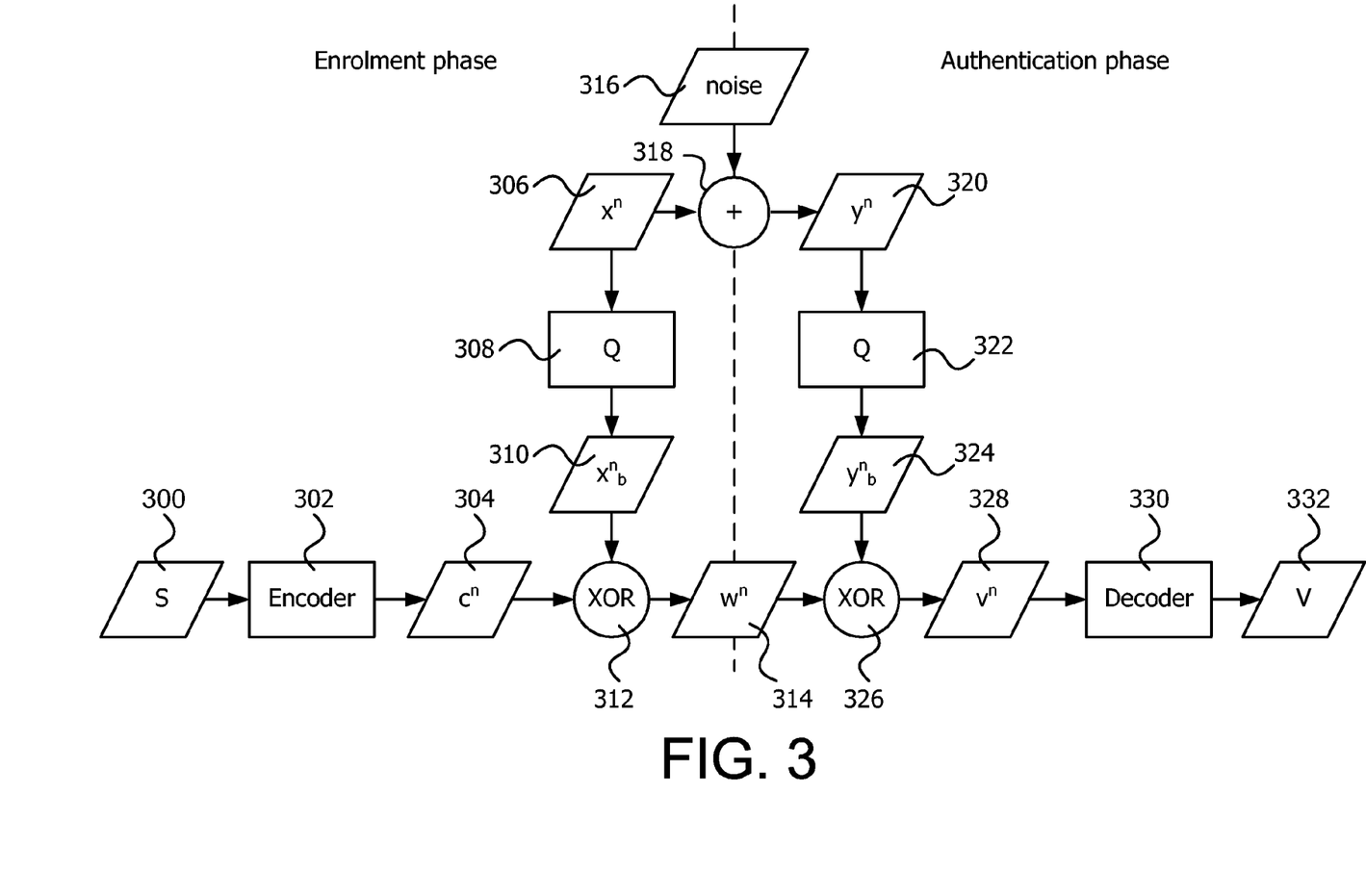
FIG. 3 diagrammatically illustrates an approach for protecting biometric data.

When the biometric data is converted according to the above described methods, the processes of the enrolment and authentification phase may be described according to a method shown in FIG. 3.

In the enrolment phase, a randomly chosen secret S 300 is input to an encoder 302. The encoder 302 maps the secret S 300 to an error correcting codeword $c^n$ 304. The error correcting code may be a single bit error correcting code, such as Hamming code, or a Reed-Solomon code, such as BCH (Bose, Ray-Chaudhuri, Hocquenghem) code. Which type of encoding to use may be different for different systems, depending on the specific demands for each system.

Upon receiving or obtaining the sequence of feature components $x^n$ 306 intended for enrolment, each of the feature components are converted by a quantizer Q 308, according to the above described methods, and assigned a codeword and concatenated into a bit string $x_b^n$ 310. Thereafter, the codeword $c^n$ 304 and the bit string $x_b^n$ 310 is processed together by an XOR-operator 312 into helper data set w 314.

Next, in the authentication phase, a sequence of feature components $y^n$ 320 is extracted from a biometric sample intended for authentication and similar as described above the feature components are quantized and converted into a bit string $y_b^n$ 324.

The sequence $y^n$ 320, derived from a biometric sample, may be seen as the sequence $x^n$ 306, derived from a different measurement of a biometric sample, with added noise 316, wherein the noise 316 is a consequence of measurement. Due to the conversion described above, i.e. dividing the Gaussian distribution into a number of intervals with preferably (approximately) equal probability and assigning a bit sequence to each interval in a way that adjacent quantization intervals have a Hamming distance of 1, the addition of noise 316 may be seen as an adder-operation, in which the sequence $x^n$ 306 and the noise 316 is input into an adder 318, and the sequence $y^n$ 320 is output.

Thereafter, the sample data codeword $y_b^n$ 324 and the helper data set 314 is input to an XOR-operator 326. The result of this operation, a codeword $v^n$ 328, is input to a decoder 330, wherein this result is decoded to a secret V 332. The decoder 330 uses the same coding principles as the encoder 302.

Finally, if the secret V 332 matches the secret S 300, the sequence $x^n$ 306 and the sequence $y^n$ 320 are considered to come from one and the same person.

The secrets S 300 and V 332 in the system illustrated in FIG. 3, may be any secret in a digital form, thus not necessarily a secret based on biometric data. However, the sequences x" 306 and y" 320 are preferably (derived from) biometric data, or other user-specific data.

Figure 4:
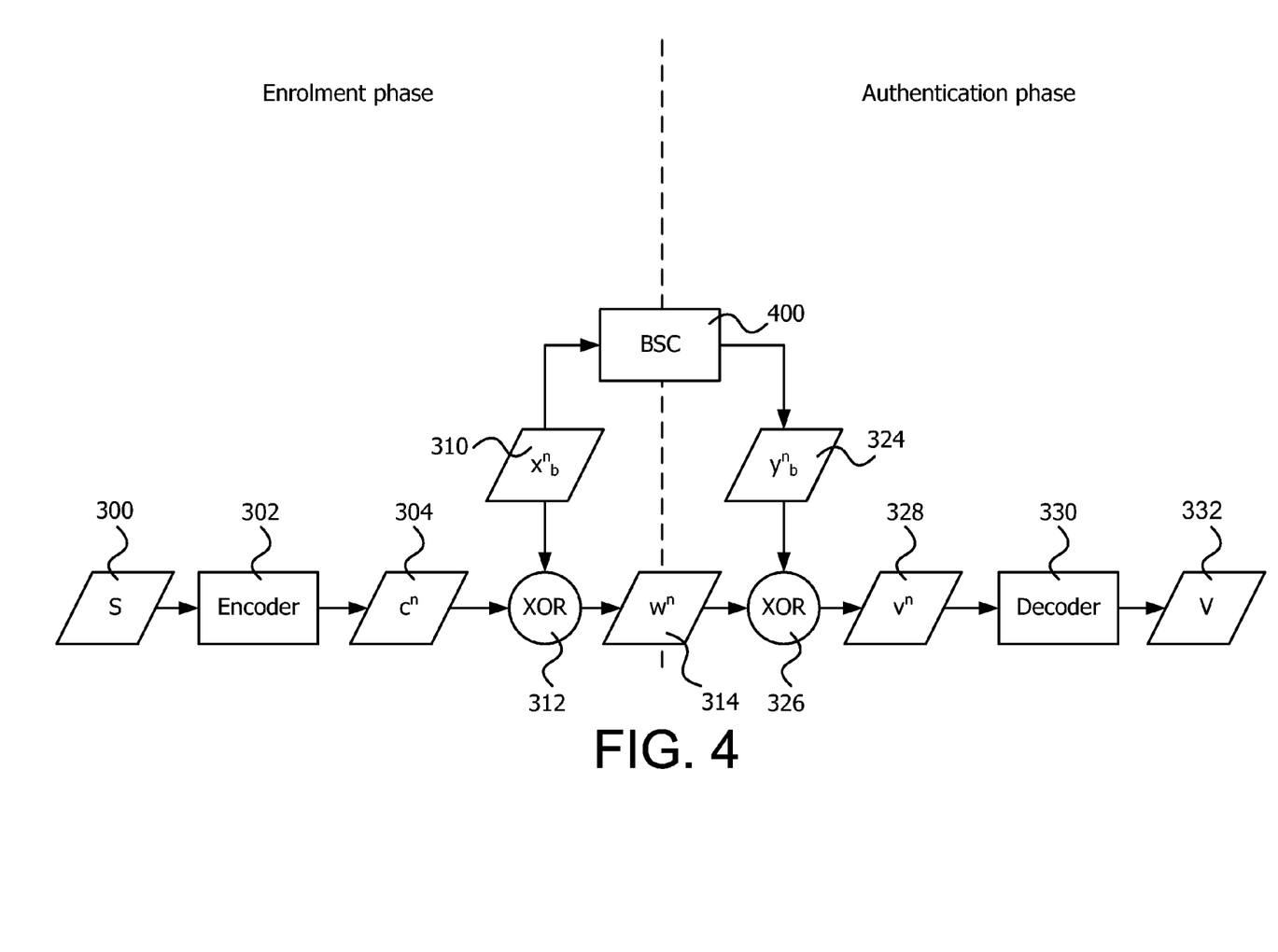
FIG. 4 diagrammatically illustrates the approach of FIG. 3 differently.

FIG. 4 illustrates the model of a Gaussian source with additive noise being replaced by an independent identically distributed source and a binary symmetric channel.

Figure 5:
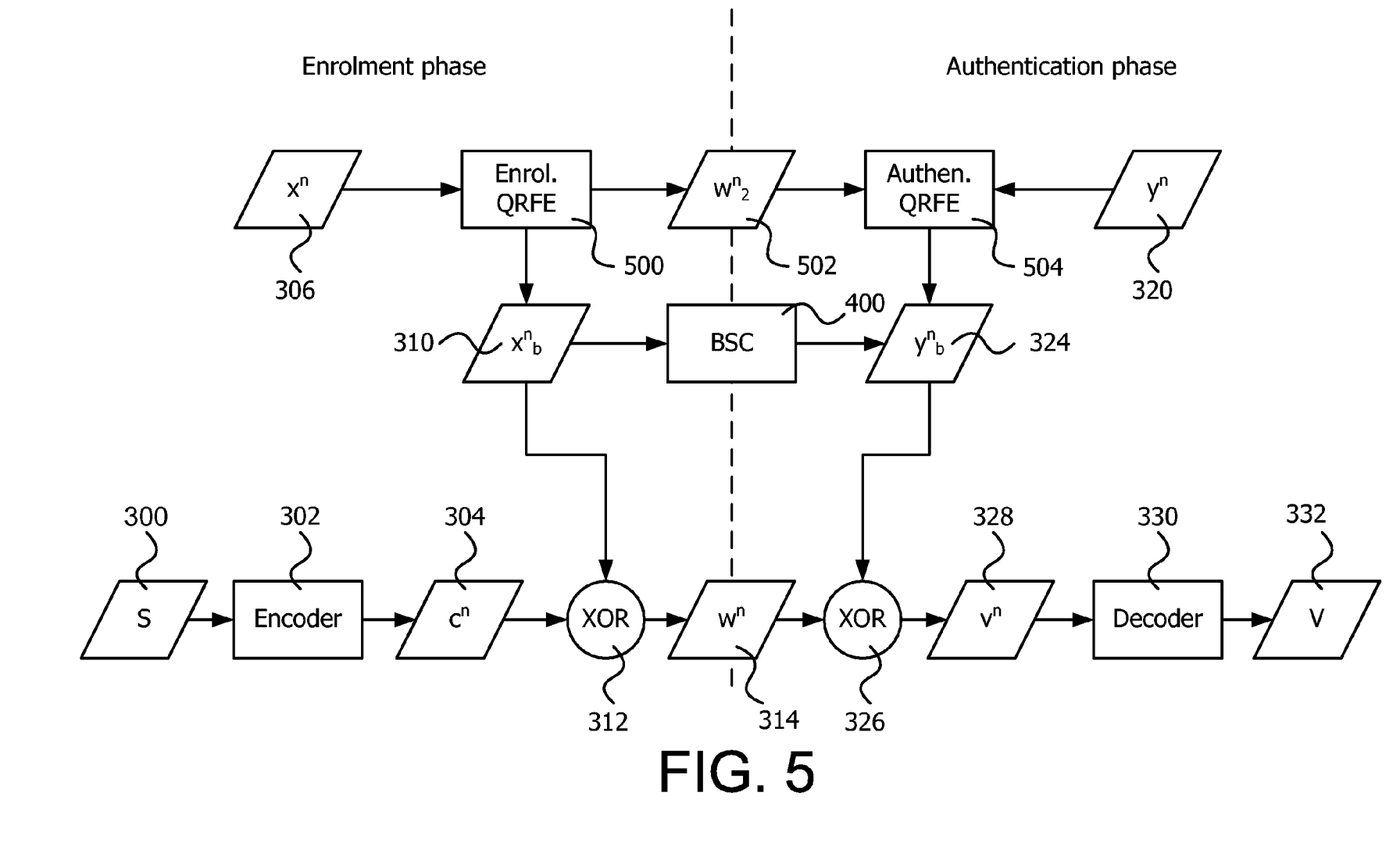
FIG. 5 diagrammatically illustrates another approach for protecting biometric data.

In another embodiment of the present invention, illustrated in FIG. 5, Quantized Robust Feature Extraction (QRFE), described in Linnartz J. P., Tuyls P., "New Shielding Functions to Enhance Privacy and Prevent Misuse of Biometric Templates", LNCS2688, AVBPA 2003, blocks are added. This makes it possible to send helper data at two different levels; at the QRFE level in order to achieve a better QRFE, and at the encoding/decoding level, described above, in order to achieve a better noise robustness.

The sequence x" 306 is input to an enrollment QRFE 500. The enrollment QRFE 500 extracts a template data bit sequence $x_b$" 310 and a helper data set $w_2$" 502 from the input sequence x" 306. The template data bit sequence $x_b$" 310 is handled in the same way as illustrated in FIG. 4, and the helper data set $w_2$" 502 is stored in a database.

In the verification phase, the biometric sample is input to an authentication QRFE 504. In order to improve the feature extraction the helper data set $w_2$" 502 is taken into consideration, when extracting the feature components.

Since the QRFE blocks are added onto the system, these blocks may be seen as a feature extracting pre-processing.

Figure 6:
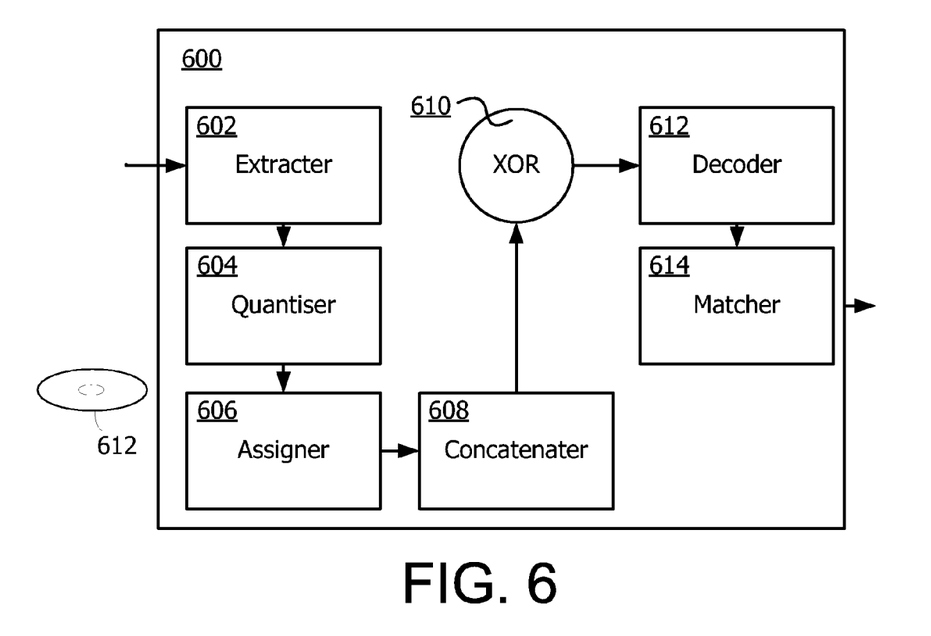
FIG. 6 diagrammatically illustrates a device for verifying the identity of a person.

FIG. 6 illustrates a device 600 for verifying the identity of a person, comprising an optional extracter 602 for extracting a number of feature components from a biometric sample, a quantizer 604 for quantizing said feature components in such a way that the probability for each quantization interval is preferably equal according to a statistical model, an assigner 606 for assigning a bit sequence to each quantized feature component in such a way that two adjacent quantization intervals have a Hamming distance of 1, a concatenater 608 for concatenating each bit sequence into a bit string, an XOR-operator 610 for combining said bit string with a helper data set w" into a codeword v", a decoder 612 for decoding said codeword v" into a secret V (332), and a matcher 614 for matching a secret S with said secret V.

Figure 7:
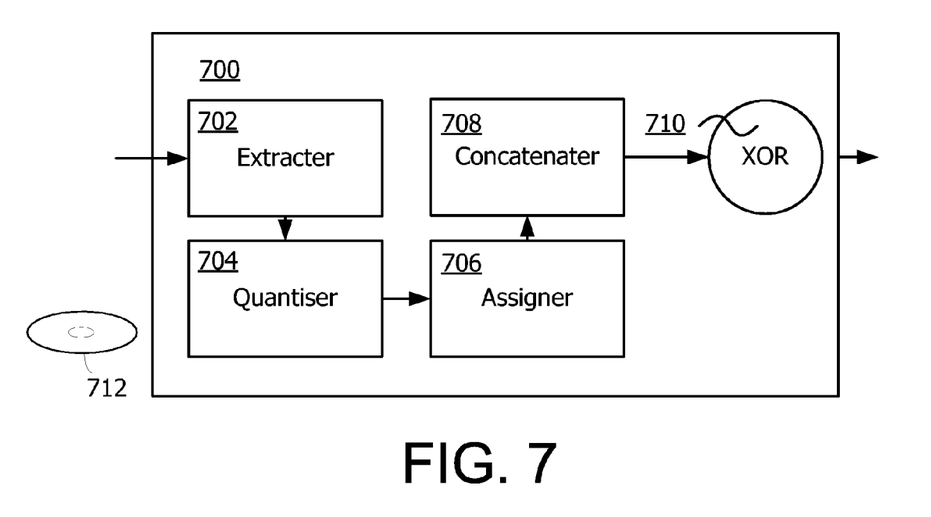
FIG. 7 diagrammatically illustrates a device for creating helper data.

FIG. 7 illustrates a device 700 for creating a helper data set w" based on a sequence x" and a secret S, comprising an optional extracter 702 for extracting a sequence of feature components from said biometric sample, a quantizer 704 for quantizing said feature components in such a way that the probability for each quantization interval is preferably equal according to a statistical model, an assigner 706 for assigning a data bit sequence $x_b$" to each quantized feature component in such a way that two adjacent quantization intervals have a Hamming distance of 1, a concatenater 708 for concatenating each bit sequence into a bit string, and an XOR-operator 710 for combining said bit string $x_b$" with a corresponding codeword c" based on said secret S into said helper data set w".

As illustrated in FIG. 6 and FIG. 7, a computer program product 612 and 712 contains executable instructions that, when downloaded to and executed on a processor, implement the steps of any of the methods described above.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for verifying the identity of a person based on a sequence of feature components extracted from a biometric sample from the person, comprising:

quantizing each feature component of said sequence of the feature components, assigning a data bit sequence to each quantized feature component in such a way that data bit sequences for adjacent quantization intervals have a Hamming distance of 1, wherein a data bit sequence for one quantization interval exhibits a Hamming distance of 1 from a data bit sequence in a next quantization interval adjacent thereto, concatenating said data bit sequence into a bit string with the data bit sequences assigned to each other quantized feature component, combining said bit string with a helper data set using an exclusive disjunction (XOR) operation into a codeword, decoding said codeword into a secret, and matching a second secret with the decoded secret.

2. The method according to claim 1, wherein each feature component is quantized into quantization intervals in such a way that the probability for each quantization interval is equal according to a statistical model.

3. The method according to claim 1, wherein said decoding is made according to an error correcting code.

4. The method according to claim 3, wherein said error correcting model is a binary error correcting code.

5. The method according to claim 4, wherein said binary error correcting code is based on a Hamming code.

6. The method according to claim 3, wherein said error correcting code is a multilevel error correcting code.

7. The method according to claim 6, wherein said multilevel error correcting code is based on a BCH (Bose, Ray-Chaudhuri, Hocquenghem) code.

8. A method for creating a helper data set based on a sequence of feature components extracted from a biometric sample from a person and a secret to enable verifying the identity of the person, comprising:

quantizing each feature component of said sequence of the feature components, assigning a data bit sequence to each quantized feature component in such a way that data bit sequences for adjacent quantization intervals have a Hamming distance of 1, wherein a data bit sequence for one quantization interval exhibits a Hamming distance of 1 from a data bit sequence in a next quantization interval adjacent thereto, concatenating said data bit sequence into a bit string with the data bit sequences assigned to each other quantized feature component, encoding said secret into a codeword, and combining said bit string with the codeword into said helper data set by using an exclusive disjunction (XOR) operation.

9. A device for verifying the identity of a person based on a sequence of feature components extracted from a biometric sample from the person, comprising:

a quantizer for quantizing the feature components of said sequence of the feature components, an assigner for assigning a bit sequence to each quantized feature component in such a way that data bit sequences for two adjacent quantization intervals have a Hamming distance of 1, wherein a data bit sequence for one quantization interval exhibits a Hamming distance of 1 from a data bit sequence in a next quantization interval adjacent thereto, a concatenater for concatenating each bit sequence, output from said assigner, into a bit string, an XOR-operator for combining said bit string with a helper data set into a codeword, a decoder for decoding said codeword into a secret, and
a matcher for matching a second secret with the decoded secret.

10. A device for creating a helper data set based on a sequence of feature components extracted from a biometric sample from a person and a secret, comprising:
   a quantizer for quantizing the feature components of said sequence of the feature components,
   an assigner for assigning a data bit sequence to each quantized feature component in such a way that data bit sequences for two adjacent quantization intervals have a Hamming distance of 1, wherein a data bit sequence for one quantization interval exhibits a Hamming distance of 1 from a data bit sequence in a next quantization interval adjacent thereto,
   a concatenater for concatenating each bit sequence, output from said assigner, into a bit string, and
   an XOR-operator for combining said bit string with a corresponding codeword based on said secret into said helper data set.

11. A non-transitory computer readable medium having embodied thereon computer executable instructions that, when executed, implement a method for verifying the identity of a person based on a sequence of feature components extracted from a biometric sample from the person, the method comprising:
   quantizing each feature component of said sequence of the feature components;
   assigning a data bit sequence to each quantized feature component in such a way that data bit sequences for adjacent quantization intervals have a Hamming distance of 1, wherein a data bit sequence for one quantization interval exhibits a Hamming distance of 1 from a data bit sequence in a next quantization interval adjacent thereto;
   concatenating said data bit sequence into a bit string with the data bit sequences assigned to each other quantized feature component;
   combining said bit string with a helper data set using an exclusive disjunction operation into a codeword;
   decoding said codeword into a secret; and
   matching a second secret with the decoded secret.

* * * * *